United States Patent Office 2,715,613
Patented Aug. 16, 1955

2,715,613

DEFOAMER

Paul Gibson, Chicago, Ill., assignor to Swift & Company, Chicago, Ill., a corporation of Illinois No Drawing. Application October 12, 1950,
Serial No. 189,897

4 Claims. (Cl. 252—321)

The present invention relates generally to defoaming, and more particularly to a defoamer and defoaming composition especially adapted to prevent or abate the foaming of dye media, casein or soy flour size, protein solutions and/or dispersions and like foamable materials.

Many defoamers have heretofore been disclosed for the prevention of foam in solutions of the type mentioned above, but there remains a demand for agents having improved defoaming action.

It is, therefore, an object of the present invention to provide an improved defoaming agent.

It is a further object of the present invention to provide a defoaming agent for the prevention of foam in solutions of the above-mentioned type.

It is an additional object of the present invention to provide a method for abating and minimizing foam formation of foamable materials.

Additional objects, if not specifically set forth herein, will be readily apparent to one skilled in the art from the following detailed description of the invention.

It has now been found that a particular compound and compositions containing such compound have a marked effect on the amount of foam produced during the heating or agitation of solutions or dispersions of dye media, casein or soy flour size, proteins and like foamable materials. The addition of small amounts of this compound results in a considerably greater decrease in the amount of foam formed than has been found to result from the use of heretofore known defoamers.

The particular defoamer of the present invention is pentaerythritol monostearate. The defoamer may be used alone or in a defoaming composition in combination with a dispersing agent selected from the group consisting of mineral oils, kerosene, glyceride oils, pine oils, water, or a mixture of one or more of these agents. The preferred composition comprises about 5 per cent to 10 per cent by weight of the pentaerythritol monostearate dispersed in a suitable dispersing agent selected from the group mentioned above.

No claim is made to the method of manufacturing the defoamer per se, and it may be made in accordance with any method known to the art. For the sake of illustration, the pentaerythritol may be prepared by reacting acetaldehyde with formaldehyde in aqueous solution at a temperature within the range of 15° to 45° C. whereby formic acid and the desired pentaerythritol are formed. The pentaerythritol is then esterified with one molecule of stearic acid to form the monostearate.

The following table is set forth as an illustration of the superior defoaming properties of the present composition over some of the heretofore used defoamers, and it is not intended to limit the claims thereby:

Two 300 cc. batches of a red dye solution were added to separate graduated cylinders and a standard amount of defoamer dispersed in mineral oil added to one while the same amount of defoamer dispersed in lard oil was added to the other. Air was passed through the mixture and the total volume of foam and liquid at the end of two minutes carefully recorded with the following results:

| Defoamer (5% dispersion) | Cylinder A (lard oil dispersion), Total Volume, cc. | Cylinder B (mineral oil dispersion), Total Volume, cc. |
|---|---|---|
| Polyethylene glycol monostearate (merj 45) | 2,200 | 3,090 |
| Polyethylene glycol monostearate (stasoft) | 2,175 | 3,045 |
| Pentaerythritol monostearate [1] | 1,430 | 2,500 |
| Glycerol mono-monohydroxy stearate | 1,880 | 2,625 |
| Pentaerythritol mono-monohydroxystearate | 1,850 | 2,670 |

[1] As indicated by the above tests, the defoamer of the present invention, although present in the same amounts and under the same conditions as the other defoamers, in each instance caused a much smaller total volume of foam formation than did any of the known defoamers.

The same test when run on samples of a black dye produced the following result:

| Defoamer (5% dispersion) | Cylinder A (lard oil dispersion), Total Volume, cc. | Cylinder B (mineral oil dispersion), Total Volume, cc. |
|---|---|---|
| Polyethylene glycol monostearate (merj 45) | 1,425 | 2,120 |
| Polyethylene glycol monostearate (stasoft) | 1,400 | 2,150 |
| Pentaerythritol monostearate [1] | 525 | 1,000 |
| Glycerol mono-monohydroxy stearate | 1,275 | 1,950 |
| Pentaerythritol mono-monohydroxystearate | 1,200 | 2,500 |

[1] See footnote to table above.

Although the defoamer of the present invention has been above illustrated as being added prior to foam formation in the various solutions, it may also be added at any time during or after the formation of foam to inhibit or abate the foaming of the solution.

The following examples of the present defoamer are provided as further illustration of the improved results attained:

| Ingredients | Defoamers | | | |
|---|---|---|---|---|
| | PM-1 | PM-2 | PM-3 | PM-4 |
| Pentaerythritol monostearate | Percent 5 | Percent 5 | Percent 10 | Percent 5 |
| Glyceride Oil (Horse Grease) | 94 | | | |
| Cresol | 1 | | | |
| Mineral Oil | | 95 | | |
| Xylol | | | 90 | 5.0 |
| Paraffin Wax | | | | 12.5 |
| Sulfated Sperm Oil | | | | 1.25 |
| Triethanolamine | | | | 0.9 |
| Water | | | | 75.35 |

Foam in the following tests was generated in a vertical glass cylinder by passing finely dispersed air through 300 cc. of the liquid.

In the table below, "A" indicates that the foam was allowed to build up to a predetermined level, 0.03 per cent defoamer was added, and the minimum level to which the foam dropped was recorded. "B" indicates that 0.03 per cent defoamer was added to the liquid prior to generation of foam, and the foam volume after 2 minutes of air passage was recorded.

| Defoamer | Solution 1% Soy Flour | | Solution 1% Whey Flour | | Solution 1% Soldium Bicarbonate, 0.1% Casein | |
|---|---|---|---|---|---|---|
| | A | B | A | B | A | B |
| PM-1 | 400 | 625 | 350 | 360 | 375 | 450 |
| PM-2 | 1,875 | 2,350 | 400 | 430 | 900 | 650 |
| PM-3 | 760 | 1,225 | 795 | 590 | 2,225 | 1,850 |
| PM-4 | 460 | 675 | 460 | 520 | 2,450 | 2,900 |
| Control (none) | 2,500 | 2,675 | 3,200 | 4,500 | 3,200 | 4,700 |

As illustrated above, the present defoamer shows both marked inhibiting and abating properties for foam.

As mentioned above, the pentaerythritol monostearate may be added alone or preferably in combination with one of the dispersing agents hereinbefore named. In certain instances, where necessary, a fungicide such as cresol or the like may be added to the defoaming composition to destroy and inhibit spore and fungi growth in the solution being treated (defoamer PM-1 above). This is desirable practice when the defoaming composition of the present invention is used in treating soy flour size and like type solutions which tend to spoil or "go sour" during use.

Obviously many modifications and variations of the invention hereinbefore set forth may be made without departing from the spirit and scope thereof, and therefore only such limitations should be imposed as are indicated in the appended claims.

I claim:

1. A method of abating foam produced by heating and agitating solutions and dispersions of foamable materials which comprises: adding to said solutions and dispersions an agent consisting essentially of a 5 to 10 percent by weight dispersion of pentaerythritol monostearate in a liquid media, in an amount to substantially inhibit foaming of the material.

2. The method of claim 1 wherein the foamable material is a casein size.

3. The method of claim 1 wherein the foamable material is a soy flour size.

4. The method of claim 1 wherein the foamable material is a dye media dispersion.

References Cited in the file of this patent

UNITED STATES PATENTS

| | | |
|---|---|---|
| 1,150,499 | Carr | Aug. 17, 1915 |
| 2,266,018 | Fleysher et al. | Dec. 16, 1941 |
| 2,290,413 | DeGroote | July 21, 1942 |
| 2,346,928 | Lighthipe | Apr. 18, 1944 |
| 2,389,429 | Boissonou | Feb. 12, 1945 |
| 2,500,349 | DeGroote | Mar. 14, 1950 |

OTHER REFERENCES

Emulsions and Foams, Berkman et al. (1941), page 149.